(12) United States Patent
Kim et al.

(10) Patent No.: US 8,390,767 B2
(45) Date of Patent: Mar. 5, 2013

(54) DISPLAY PANEL AND METHOD FOR MANUFACTURING THE SAME

(75) Inventors: Min-Jae Kim, Suwon-si (KR); Jae-Jin Lyu, Yongin-si (KR); Seung-Beom Park, Seoul (KR); Ji-Won Sohn, Seoul (KR); Jun-Hyup Lee, Seoul (KR); Myeong-Ha Kye, Seoul (KR); Hoon Kim, Ansan-si (KR); Min-Goo Seok, Yongin-si (KR)

(73) Assignee: Samsung Display Co., Ltd. (KR)

( * ) Notice: Subject to any disclaimer, the term of this patent is extended or adjusted under 35 U.S.C. 154(b) by 823 days.

(21) Appl. No.: 12/416,417

(22) Filed: Apr. 1, 2009

(65) Prior Publication Data
US 2010/0007830 A1    Jan. 14, 2010

(30) Foreign Application Priority Data
Jul. 14, 2008   (KR) .................................. 2008-67967

(51) Int. Cl.
*G02F 1/1333* (2006.01)
*G02F 1/1343* (2006.01)

(52) U.S. Cl. .............................. 349/92; 349/93; 349/144

(58) Field of Classification Search ................ 349/92, 349/93, 144
See application file for complete search history.

(56) References Cited

U.S. PATENT DOCUMENTS

| | | | |
|---|---|---|---|
| 6,778,229 B2* | 8/2004 | Inoue et al. ..................... 349/39 |
| 2006/0256271 A1* | 11/2006 | Shimoshikiryo ............. 349/144 |
| 2007/0064191 A1* | 3/2007 | Shin et al. ..................... 349/144 |
| 2008/0211983 A1* | 9/2008 | Tsao et al. ..................... 349/48 |
| 2009/0135321 A1* | 5/2009 | Su et al. ......................... 349/37 |

* cited by examiner

Primary Examiner — Uyen Chau N Le
Assistant Examiner — Chris Chu
(74) Attorney, Agent, or Firm — Cantor Colburn LLP

(57) ABSTRACT

A method of manufacturing a display panel, the method includes forming a display panel including a first substrate, the first substrate including a pixel electrode disposed thereon, a second substrate including a common electrode disposed thereon, and a liquid crystal layer interposed between the first and the second substrates, the liquid crystal layer including a plurality of liquid crystal molecules and a plurality of ultraviolet ("UV")-curable particles; and curing a portion of the UV-curable particles by irradiating light on the display panel, wherein an exposure voltage, which is greater than a maximum data voltage corresponding to maximum grayscale data of the display panel, is applied between the pixel electrode and the common electrode. Also described is a display panel.

7 Claims, 9 Drawing Sheets

DISPLAY PANEL AND METHOD FOR MANUFACTURING THE SAME

This application claims priority to Korean Patent Application No. 2008-67967, filed on Jul. 14, 2008, and all the benefits accruing therefrom under 35 U.S.C. §119, the contents of which in its entirety are herein incorporated by reference.

BACKGROUND OF THE INVENTION

1. Field of the Invention

This disclosure relates to a display panel and a method for manufacturing the display panel.

2. Description of the Related Art

Generally, a liquid crystal display ("LCD") device includes an LCD panel, which displays an image using the light transmissivity of liquid crystal molecules, and a backlight assembly disposed below the LCD panel to provide light on the LCD panel.

The LCD panel includes a first substrate, comprising a plurality of pixel electrodes and a plurality of thin-film transistors ("TFTs") which are electrically connected to the pixel electrodes, a second substrate having a common electrode and a plurality of color filters, and a liquid crystal layer interposed between the first and second substrates.

The LCD panel may be operated in a patterned vertical alignment ("PVA") mode to provide an improved viewing angle and a superior contrast ratio ("CR"). When a PVA LCD panel is manufactured, a rubbing process is not required, however, a process of patterning the common electrode of the second substrate may be added. However, when the PVA LCD panel is manufactured, the process of patterning the common electrode may result in misalignment between the first and second substrates and reduce an aperture ratio.

To overcome these and other problems, a super vertical alignment ("SVA") technology has been developed. In the SVA technology, liquid crystal molecules and ultraviolet ("UV")-curable particles are injected between the first and second substrates, and the UV-curable particles are cured to pretilt the liquid crystal molecules under conditions in which a data voltage, corresponding to a gray scale value of full white, is applied between the first and second substrates.

However, a current process for curing the UV-curable particles may require the data voltage to be applied between the first and the second substrates for a long time, thus increasing a processing time for manufacturing an LCD display panel. Therefore it would be desirable to shorten process time required to cure the UV-curable particles.

BRIEF SUMMARY OF THE INVENTION

Exemplary embodiments provide a display panel capable of reducing processing time.

Exemplary embodiments also provide a method for manufacturing the above-mentioned display panel.

The above described and other drawbacks are alleviated by a method of manufacturing a display panel, the method comprises forming a display panel comprising a first substrate, the first substrate including a pixel electrode disposed thereon, a second substrate including a common electrode disposed thereon, and a liquid crystal layer interposed between the first and the second substrates, the liquid crystal layer comprising a plurality of liquid crystal molecules and a plurality of ultraviolet ("UV")-curable particles; and curing a portion of the UV-curable particles by disposing light on the display panel, wherein an exposure voltage, which is greater than a maximum data voltage, which corresponds to a maximum gray-scale data of the display panel, is applied between the pixel electrode and the common electrode.

In an exemplary embodiment, the exposure voltage may have a range of about 7 V to about 20 V.

In an exemplary embodiment, the remaining particles among the UV-curable particles that have not been cured may be cured by disposing light on the display panel, wherein the exposure voltage is not applied between the pixel electrode and the common electrode.

In an exemplary embodiment, the pixel electrode may include a lower pixel electrode for receiving a first data voltage, and a higher pixel electrode for receiving a second data voltage, which is greater than the first data voltage.

In an exemplary embodiment, curing the portion of the UV-curable particles may include applying a first exposure voltage, which is greater than the maximum data voltage, to the lower pixel electrode, and applying a second exposure voltage, which is greater than the first exposure voltage, to the higher pixel electrode.

In an exemplary embodiment, curing the portion of the UV-curable particles may include applying light of a first energy level on the lower pixel electrode, and applying light of a second energy level, which is greater than the light of the first energy level, to the higher pixel electrode.

In an exemplary embodiment, the light may be UV light. The content of the UV-curable particles may be equal to or less than about 0.2 weight percent (wt %) with respect to the liquid crystal molecules. The pixel electrode may have a plurality of micro-slit patterns formed therethrough.

Also disclosed is a display panel comprising a first substrate comprising a pixel electrode, the pixel electrode including a lower pixel electrode which receives a first data voltage and a higher pixel electrode which receives a second data voltage, wherein the second data voltage is greater than the first data voltage; a second substrate comprising a common electrode disposed facing the first substrate; and a liquid crystal layer interposed between the first and the second substrates, the liquid crystal layer comprising a plurality of liquid crystal molecules and a plurality of UV-curable particles, the UV-curable particles pretilting the liquid crystal molecules corresponding to the lower pixel electrode at a first pretilt angle, and pretilting the liquid crystal molecules corresponding to the higher pixel electrode at a second pretilt angle, wherein the first pretilt angle and the second pretilt angle are different.

In an exemplary embodiment, the pretilt angle of the liquid crystal molecules corresponding to the higher pixel electrode may be greater than that of the liquid crystal molecules corresponding to the lower pixel electrode. Alternatively, the pixel electrode may include a plurality of micro-slit patterns formed therethrough.

Also disclosed is a method of manufacturing a display panel, the method comprises disposing a display panel comprising a first substrate comprising a pixel electrode, the pixel electrode comprising a lower pixel electrode which receives a first data voltage and a higher pixel electrode which receives a second data voltage, wherein the second data voltage is greater than the first data voltage; a second substrate comprising a common electrode disposed thereon; and a liquid crystal layer comprising a plurality of liquid crystal molecules and a plurality of UV-curable particles, the liquid crystal layer interposed between the first and the second substrates; and curing a portion of the UV-curable particles by disposing light on the display panel to pretilt the liquid crystal molecules corresponding to the lower pixel electrode at a first pretilt angle and pretilting the liquid crystal molecules corresponding to the higher pixel electrode at a second pretilt angle, wherein the first pretilt angle and the second pretilt angle are different, and wherein an exposure voltage is applied between the pixel electrode and the common electrode during the curing.

In an exemplary embodiment, a pretilt angle of the liquid crystal molecules corresponding to the higher pixel electrode may be greater than a pretilt angle of the liquid crystal molecules corresponding to the lower pixel electrode.

In an exemplary embodiment, curing a portion of the UV-curable particles may include applying a first exposure voltage to the lower pixel electrode, and a second exposure voltage, which is greater than the first exposure voltage, to the higher pixel electrode.

In an exemplary embodiment, curing a portion of the UV-curable particles may include applying the exposure voltage to the lower pixel electrode for the first time, and applying the exposure voltage to the higher pixel electrode for the second time, which is longer than the first time.

In an exemplary embodiment, curing a portion of the UV-curable particles may include applying light of a first energy level to the lower pixel electrode, and light of a second energy level, which is greater than the first energy level, is applied to the higher pixel electrode.

In an exemplary embodiment, curing a portion of the UV-curable particles may include applying the light to the lower pixel electrode for a first time, and applying light to the higher pixel electrode for a second time, which is longer than the first time.

Alternatively, in an exemplary embodiment, curing the remaining UV-curable particles that have not been cured may include disposing light on the display panel under conditions in which the exposure voltage is not applied between the pixel electrode and the common electrode. The pixel electrode may include micro-slit patterns.

In an embodiment, the UV-curable particles are cured under conditions in which an exposure voltage, which is higher than a maximum data voltage corresponding to maximum grayscale data of the display panel, is applied between a pixel electrode and a common electrode, so that the time required for curing the UV-curable particles may be reduced.

Moreover, the UV-curable particles are cured to pretilt the liquid crystal molecules at different angles from each other with respect to the lower and the higher pixel electrodes, respectively, so that a visibility property of the display panel may be improved.

BRIEF DESCRIPTION OF THE DRAWINGS

The above and other aspects, features, and advantages of the invention will become more apparent by describing in further detail exemplary embodiments thereof with reference to the accompanying drawings, in which.

DETAILED DESCRIPTION OF THE INVENTION

Figure 1:
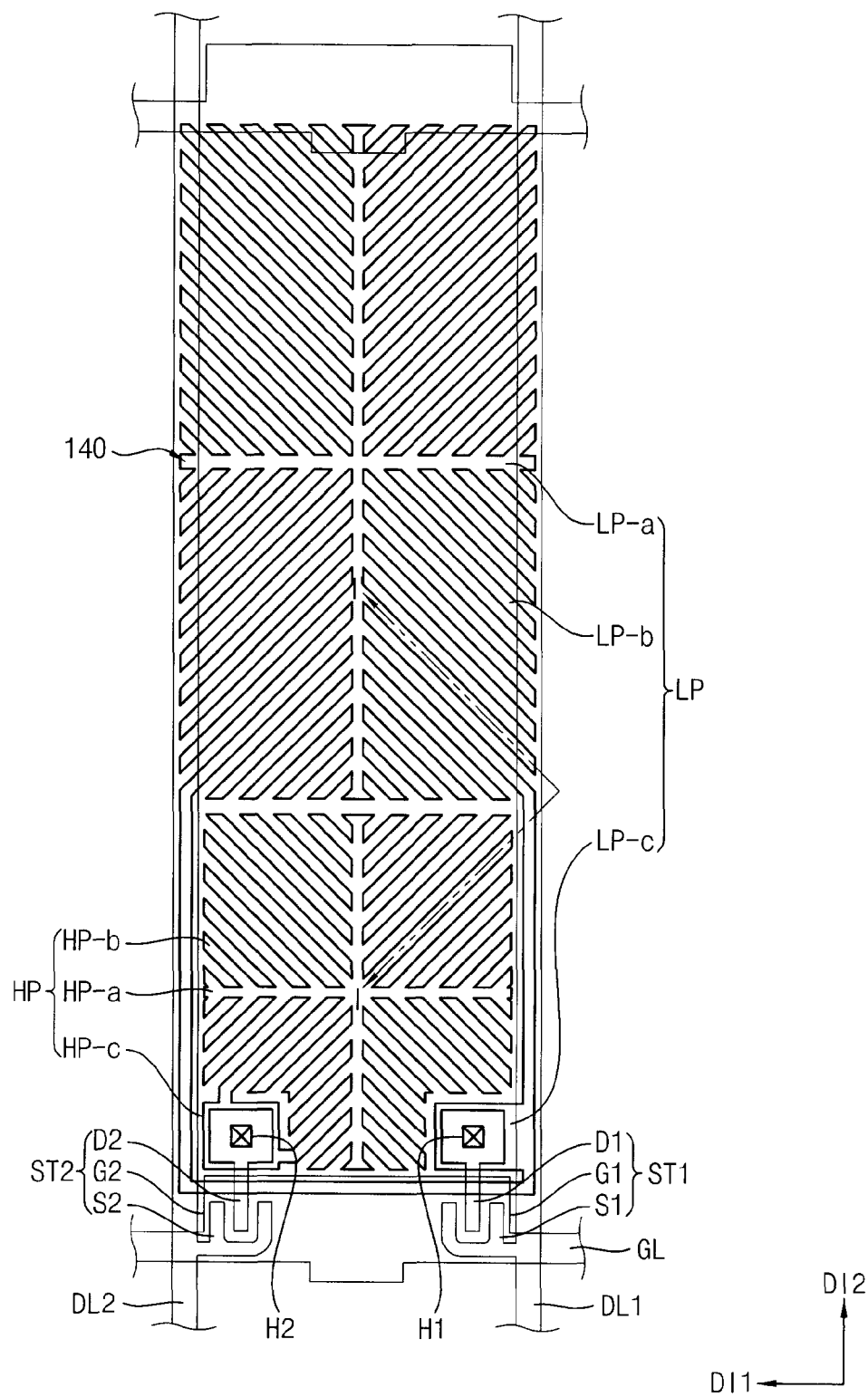
FIG. 1 is a plan view illustrating an exemplary embodiment of a portion of a display panel.

The invention is described more fully hereinafter with reference to the accompanying drawings, in which exemplary embodiments are shown. The invention may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected to or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc., or upper or lower, may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of this disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations, as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the disclosed embodiments will be explained in further detail with reference to the accompanying drawings.

Figure 2:
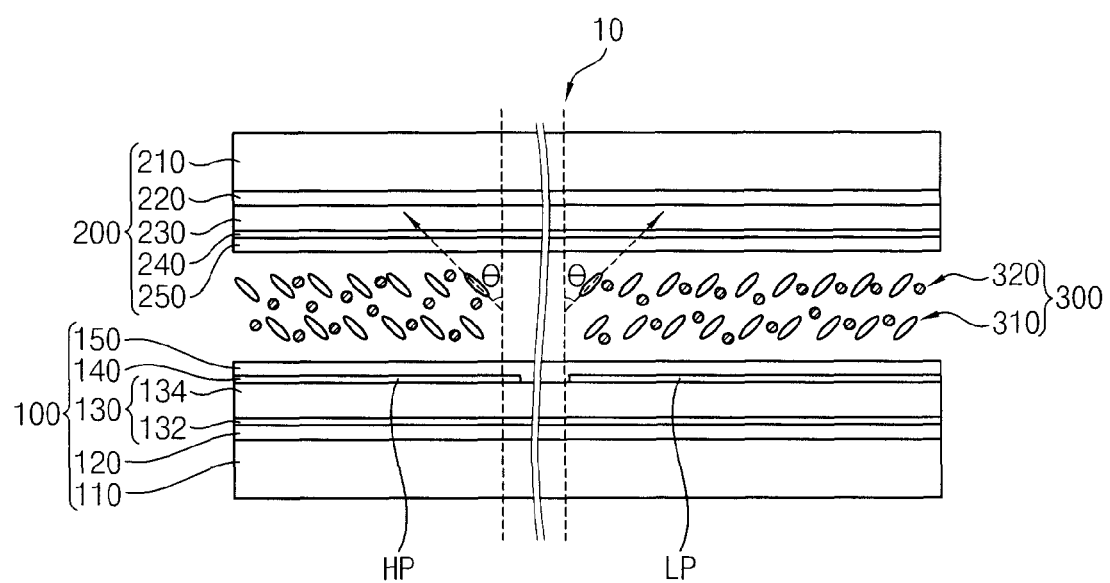
FIG. 2 is a cross-sectional view taken along line I-I' in FIG. 1 showing an exemplary embodiment of the display panel.

FIG. 1 is a plan view illustrating an exemplary embodiment of a portion of a display panel according to an embodiment. FIG. 2 is a cross-sectional view taken along line I-I' in FIG. 1.

Referring to FIGS. 1 and 2, a display panel includes a first substrate 100, a second substrate 200 facing the first substrate 100, and a liquid crystal layer 300 interposed between the first substrate 100 and the second substrate 200.

The first substrate 100 includes a first transparent substrate 110, a gate line GL, a gate insulation layer 120, a first data line DL1, a second data line DL2, a first thin-film transistor ("TFT") ST1, a second TFT ST2, a protective layer 130, a pixel electrode 140, and a first alignment layer 150.

The gate line GL is disposed on the first transparent substrate 110 in a first direction D11. The gate insulation layer 120 is disposed on the first transparent substrate 110 and the gate line GL. In an embodiment, the gate insulation layer 120 substantially covers an entire surface of the gate line GL. The first and the second data lines DL1 and DL2 are disposed on the gate insulation layer 120 in a second direction D12, which is substantially perpendicular to the first direction D11. A first data voltage may be applied to the first data line DL1, and a second data voltage, which is greater than the first data voltage, may be applied to the second data line DL2.

The first TFT ST1 may include a first gate electrode G1, which protrudes from the gate line GL, a first active pattern (not shown) disposed on the gate insulation layer 120 corresponding to the first gate electrode G1, a first source electrode S1 which protrudes from the first data line DL1 and overlaps the first active pattern, and a first drain electrode D1 which is spaced apart from the first source electrode S1 and overlaps the first active pattern.

The second TFT ST2 may include a second gate electrode G2, which protrudes from the gate line GL, a second active pattern (not shown) disposed on the gate insulation layer 120 corresponding to the second gate electrode G2, a second source electrode S2 which protrudes from the second data line DL2 and overlaps the second active pattern, and a second drain electrode D2 which is spaced apart from the second source electrode S2 and overlaps with the second active pattern. In an embodiment, the first and the second gate electrodes G1 and G2 may be disposed integrally with each other.

The protective layer 130 is disposed on the gate insulation layer 120 and can substantially cover the first and the second data lines DL1 and DL2 and the first and the second TFTs ST1 and ST2. The protective layer 130 may include an inorganic insulation layer 132 and an organic insulation layer disposed on the inorganic insulation layer 132. The inorganic insulation layer 132 is disposed on the gate insulation layer 120 and can substantially cover the first and the second data lines DL1 and DL2 and the first and the second TFTs ST1 and ST2.

The pixel electrode 140 is formed on the protective layer 130 within a unit pixel. The pixel electrode 140 may include a material that is optically transparent and electrically conductive. The pixel electrode 140 includes a lower pixel electrode LP, which is electrically connected to the first drain electrode D1, and a higher pixel electrode HP, which is spaced apart from the lower pixel electrode and is electrically connected to the second drain electrode D1. In an embodiment, the lower pixel electrode LP may be larger than the higher pixel electrode HP.

The pixel electrode 140, which comprises the lower and the higher pixel electrodes LP and HP, may comprise a plurality of slits. In an embodiment, the slits are a micro-slit pattern.

In an embodiment, the lower pixel electrode LP may include a lower stem portion LP-a comprising a cross shape, a lower branch portion LP-b comprising a radial shape and protruding from the lower stem portion LP-a, and a lower contact portion LP-c which is electrically connected to the lower stem portion LP-a or the lower branch portion LP-b and overlaps the first drain electrode D1. In an embodiment the lower contact portion LP-c electrically contacts the first drain electrode D1 through a first contact hole H1, which is disposed through the protective layer 130.

The higher pixel electrode HP may include a higher stem portion HP-a comprising a cross shape, a higher branch portion HP-b comprising a radial shape and protruding from the higher stem portion HP-a, and a higher contact portion HP-c electrically connected to the higher stem portion HP-a or the higher branch portion HP-b and overlapping the second drain electrode D2. In an embodiment, the higher contact portion HP-c electrically contacts the second drain electrode D2 through a second contact hole H2 which is disposed through the protective layer 130.

The first alignment layer 150 is disposed on the protective layer 130 and covers the pixel electrode 140.

The second substrate 200 may include a second transparent substrate 210, a color filter 220, a planarization layer 230, a common electrode 240, and a second alignment layer 250.

The color filter 220 is disposed on the second transparent substrate 210 facing the first substrate 100. The planarization layer 230 is disposed on the color filter 220 to planarize a surface of the color filter 220. The common electrode 240 may include a material which is optically transparent and electrically conductive. The common electrode 240 is disposed on the planarization layer 230. The second alignment layer 250 is disposed on the common electrode 240. Alternatively, the color filter 220 may be disposed on the first substrate 100.

The liquid crystal layer 300 is interposed between the first and the second substrates 100 and 200. The liquid crystal layer 300 includes a plurality of liquid crystal molecules 310 and a plurality of ultraviolet ("UV")-curable particles 320. Optionally, the liquid crystal layer 300 may further include a plurality of photoinitiator molecules (not shown).

The liquid crystal molecules 310 are rearranged by an electric field formed between the pixel electrode 140 and the common electrode 240 and control light transmissivity.

The UV-curable particles 320 are interposed between the liquid crystal molecules 310 and can be cured by light. The UV-curable particles 320 may pretilt the liquid crystal molecules 310 at a selected angle θ, where θ is defined with respect to a perpendicular direction 10. In an embodiment, the perpendicular direction 10 is perpendicular to a surface of the first and the second substrates 100 and 200. In an embodiment, the pretilt angle θ of the liquid crystal molecules 310, corresponding to the lower and the higher pixel electrodes, respectively, may be substantially equal to each other. In another embodiment, the pretilt angle θ of the liquid crystal molecules corresponding to the lower pixel electrode may be equal to θ and the pretilt angle of the liquid crystal molecules corresponding to the higher pixel electrode may be equal to $-\theta$.

The UV-curable particles 320 may be contained in an amount between about 0.01 weight percent (wt %) to about 3 wt %, specifically between about 0.05 wt % to about 2 wt %, more specifically between about 0.1 wt % to about 1 wt %, based on the liquid crystal molecules 310. In an embodiment, the UV-curable particles 320 may be contained in an amount of less than or equal to about 0.2 weight percent (wt %) with respect to the liquid crystal molecules 310. The UV-curable particles 320 may include polymers, oligomers, or monomers selected from acrylate and (meth)acrylate monomers, oligomers and polymers and copolymers, including urethane acrylates, epoxy acrylates, polyester acrylates, elastomeric (meth) acrylates, including mono, di, tri and tetra functional monomers or related oligomeric or polymeric compositions which optionally may be end-capped with monomeric units containing polymerizable double bonds, including vinyl or vinyl-type monomers, oligomers and polymers including those based on vinyl chloride, vinyl alcohol, vinyl acetate and related vinyl monomers, oligomers and polymers, or the like, or a combination comprising at least one of the foregoing UV-curable compounds. In an embodiment, the UV-curable particles 320 may include acryl, methacryl, dienyl, or vinyl groups.

The liquid crystal layer 300 may further include photo initiator molecules (not shown) to initiate curing of the UV-curable particles 320.

Figure 3:
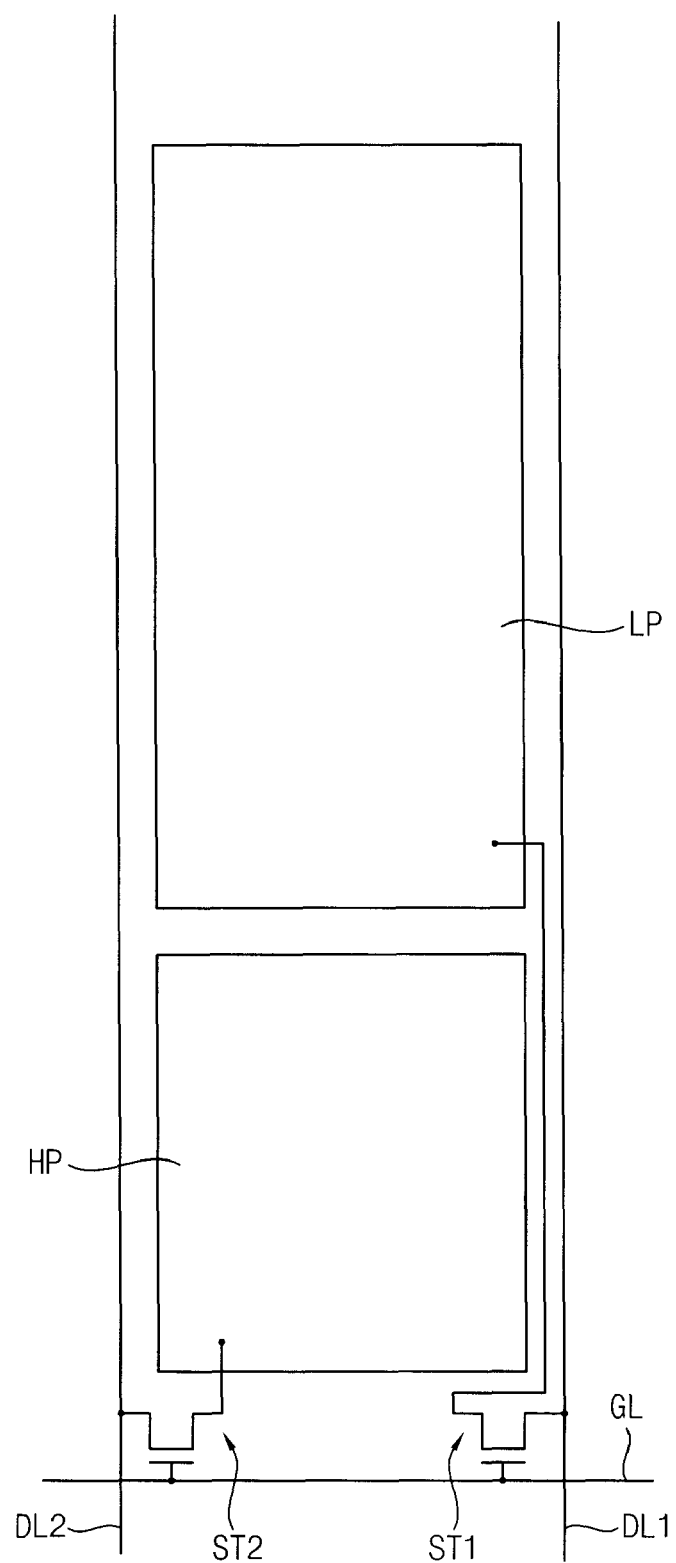
FIG. 3 is a simplified circuit diagram schematically illustrating an exemplary embodiment of the display panel in FIG. 1.

FIG. 3 is a simplified circuit diagram schematically illustrating an exemplary embodiment of the display panel in FIG. 1.

Referring to FIGS. 1 and 3, the first TFT ST1 is electrically connected to the lower pixel electrode LP. When a gate signal is applied to the gate line GL, the first data voltage transmitted to the first data line DL1 is applied to the lower pixel electrode LP.

Also, the second TFT ST2 is electrically connected to the higher pixel electrode HP. When a gate signal is applied to the gate line GL, the second data voltage, transmitted to the second data line DL1, is applied to the higher pixel electrode HP.

Figure 4:
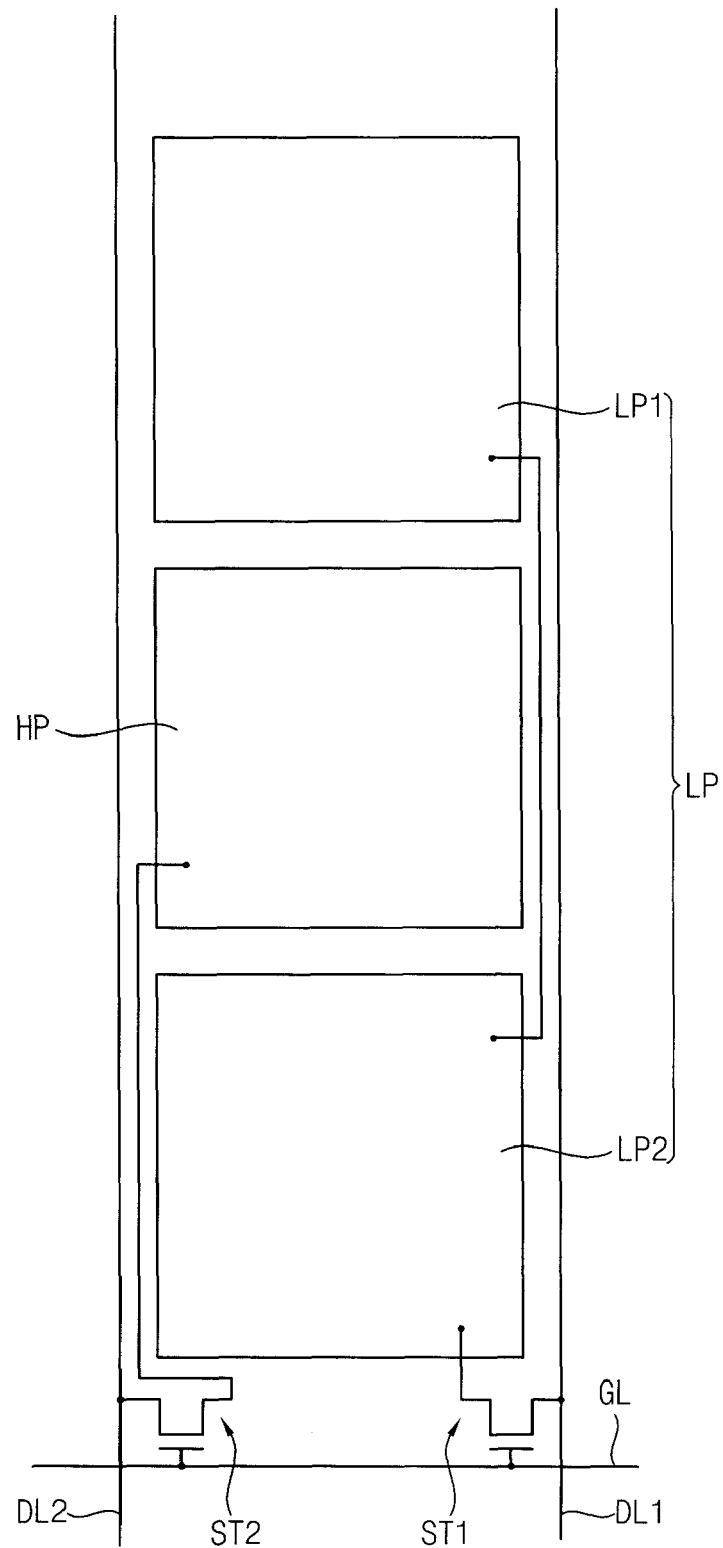
FIG. 4 is a simplified circuit diagram schematically illustrating an exemplary embodiment of a pixel electrode divided into three sections on the display panel in FIG. 1.

FIG. 4 is a simplified circuit diagram schematically illustrating an exemplary embodiment of a pixel electrode divided into three sections on the display panel in FIG. 1.

Referring to FIG. 4, the lower pixel electrode LP may include a first and a second lower pixel electrodes LP1 and LP2 electrically connected to each other. In an embodiment, the higher pixel electrode HP is disposed between the first and the second lower pixel electrodes LP1 and LP2.

Hereinafter, a process for manufacturing a display panel, as shown in FIGS. 1 to 4, is described in further detail.

Figure 5:
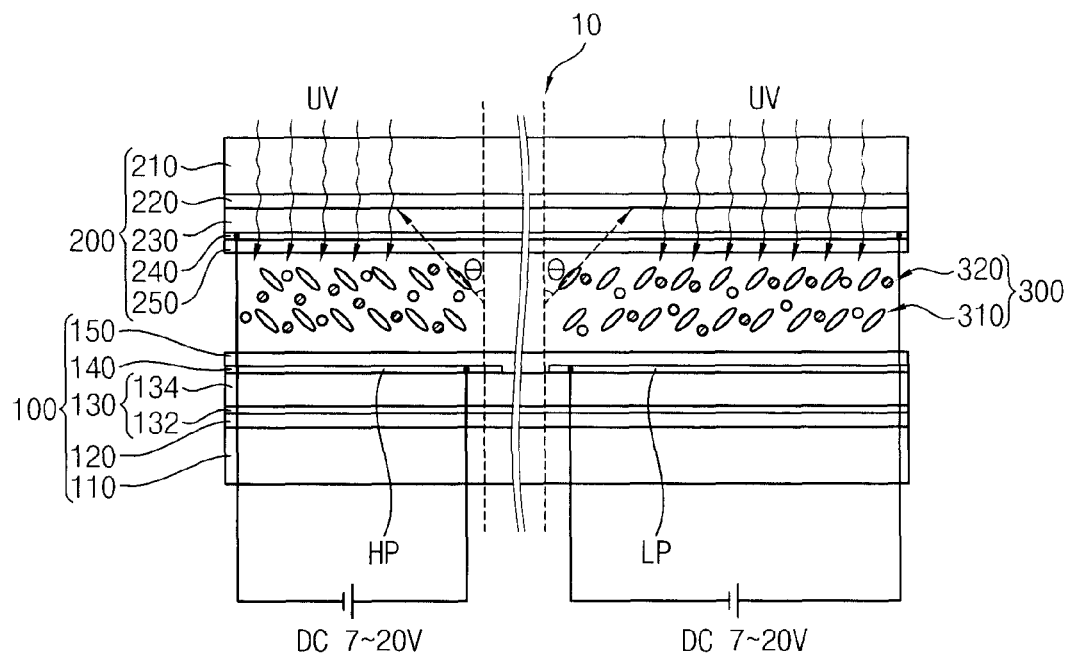
FIGS. 5 and 6 are cross-sectional views schematically illustrating an exemplary embodiment of a process for manufacturing the display panel in FIG. 1.
Figure 6:
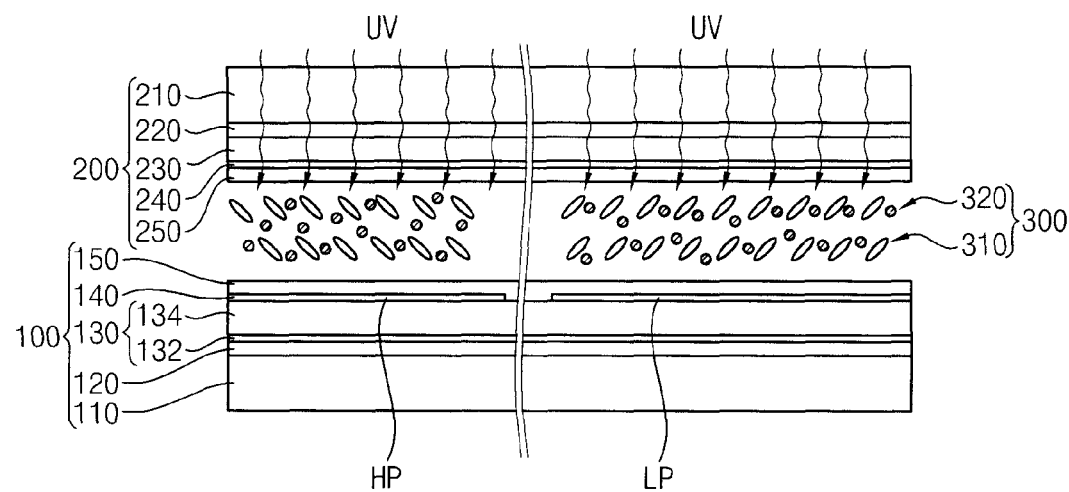

FIGS. 5 and 6 are cross-sectional views schematically illustrating an exemplary embodiment of a process for manufacturing the display panel in FIG. 1. More particularly, FIG. 5 is a cross-sectional view schematically illustrating an exemplary embodiment of a process in which light is applied while an exposure voltage is applied between a pixel electrode and a common electrode, and FIG. 6 is a cross-sectional view schematically illustrating an exemplary embodiment of a process in which light is applied when the exposure voltage is not applied between the pixel electrode and the common electrode.

Referring to FIG. 5, the first substrate 100 and the second substrate 200 in FIGS. 1 to 4 are disposed, and then the liquid crystal molecules 310 and the UV-curable particles 320 are disposed between the first and the second substrates 100 and 200 to form the liquid crystal layer 300. Thus, in an embodiment, a display panel comprising the first substrate 100, the second substrate 200, and the liquid crystal layer 300 is disposed. In an embodiment, the liquid crystal layer 300 may further include a plurality of photoinitiator molecules to initiate curing of the UV-curable particles 320.

Then, under conditions in which an exposure voltage is applied between the pixel electrode 140 and the common electrode 240, light is disposed on the display panel to cure a portion of the UV-curable particles 320. Thus, under conditions in which the exposure voltage is applied to the pixel electrode 140 and a common voltage is applied to the common electrode 240, a portion of the UV-curable particles 320 is cured. In an embodiment, the light may be UV light. As a result, the liquid crystal molecules 320 may be pretilted at a selected angle θ with respect to the perpendicular direction.

In this embodiment, the exposure voltage is greater than a maximum data voltage which corresponds to a maximum grayscale value of the display panel. That is, the exposure voltage is greater than a maximum data voltage, which corresponds to a maximum grayscale value, which corresponds to full white. In an embodiment, the maximum data voltage is about 7 volts ("V"), and the exposure voltage may be between about 4 V to about 30 V, specifically between about 7 V to about 20 V, more specifically between about 9 V to about 18 V. In an embodiment, when the exposure voltage is less than about 7 V, the time required for curing the UV-curable particles 320 is increased. When the exposure voltage is more than about 20 V, the liquid crystal molecules 310 may be excessively pretilted and light leakage may result.

Alternatively, when the exposure voltage is applied to the pixel electrode 140, a different voltage may be applied to the lower and the higher pixel electrodes LP and HP. In an embodiment, a first exposure voltage, which is greater than the maximum data voltage, may be disposed on the lower pixel electrode LP, and a second exposure voltage, which is greater than the first exposure voltage, may be disposed on the higher pixel electrode HP.

Also, when the light is disposed on the display panel, light of different energy levels may be applied to the lower and the higher pixel electrodes LP and HP. For example, light of a first energy level may be applied to the lower pixel electrode LP, and light of a second energy level, which is greater than the first energy level, may be applied to the higher pixel electrode HP.

Referring to FIG. 6, after performing an exposure with an electric field, any remaining uncured UV-curable particles may be cured by disposing light on the display panel under conditions in which the exposure voltage is not applied between the pixel electrode 140 and the common electrode 240. Thus, in an embodiment, all of the remaining particles are cured without an electric field.

Accordingly, in an embodiment, when a voltage greater than a maximum data voltage, which corresponds to a maximum grayscale value which corresponds to full white, is applied to a pixel electrode and a common electrode, UV-curable particles are cured by disposing UV light on a display panel so that a time required for curing the UV-curable particles may be reduced.

Figure 7:
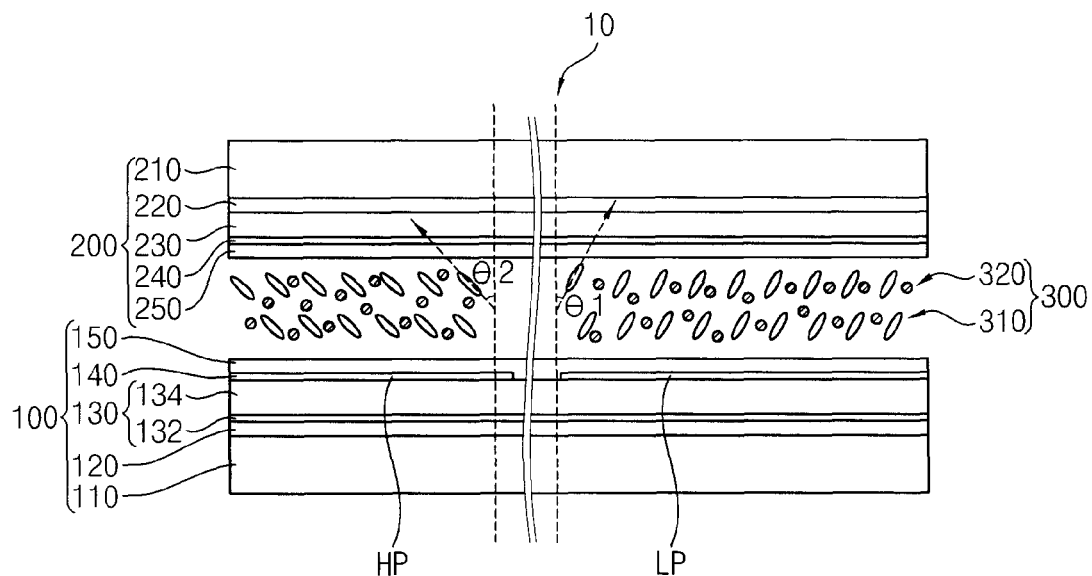
FIG. 7 is a cross-sectional view illustrating an exemplary embodiment of a portion of a display panel according to another embodiment.

FIG. 7 is a cross-sectional view illustrating a portion of a display panel according to another embodiment.

A display panel according to this embodiment is substantially identical to the display panel of the exemplary embodiment described in FIGS. 1 to 6, except for the liquid crystal layer 300. Thus, a detailed explanation of elements other than the liquid crystal layer 300 will be omitted. Also, elements substantially identical to the display panel of the above described exemplary embodiment will be used to refer to the same reference numerals as those described in FIGS. 1 to 6.

Referring to FIG. 7, a liquid crystal layer 300 is interposed between the first and second substrates 100 and 200. The liquid crystal layer 200 may include a plurality of liquid crystal molecules 310 and a plurality of UV-curable particles 320. Alternatively, the liquid crystal layer 300 may further include a plurality of photoinitiator molecules (not shown).

The liquid crystal molecules 310 are rearranged by an electric field formed between the pixel electrode 140 and the common electrode 240, which can also be used to control light transmissivity.

The UV-curable particles 320 are interposed between the liquid crystal molecules 310, and the UV-curable particles 320 are cured by light. The UV-curable particles 320 may pretilt the liquid crystal molecules 310 at a selected angle θ with respect to the perpendicular direction 10. In an embodiment, the perpendicular direction 10 is perpendicular to a surface of the first and the second substrates 100 and 200.

In this embodiment, the pretilt angles of the liquid crystal molecules 310 corresponding to the lower and the higher pixel electrodes LP and HP, induced by the UV-curable particles 320, are different from each other. In an embodiment, a second pretilt angle θ2 of liquid crystal molecules corresponding to the higher pixel electrode HP is smaller than a first pretilt angle θ1 of molecules corresponding to the lower pixel electrode LP. In another embodiment, a second pretilt angle θ2 of liquid crystal molecules corresponding to the higher pixel electrode HP is greater than a first pretilt angle θ1 of liquid crystal molecules corresponding to the lower pixel electrode LP.

In an embodiment the content the UV-curable particles 320 is less than or equal to about 0.2 wt % based on the liquid crystal molecules 310. The UV-curable particles 320 may include acryl, methacryl, dienyl, or vinyl groups. Thus the UV-curable particles may comprise acrylates, (meth)acrylates, compounds comprising polymerizable double bonds, vinyl groups, or the like, or a combination comprising at least one of the foregoing compounds.

The liquid crystal layer 300 may further include photoinitiator molecules (not shown) to initiate curing of the UV-curable particles 320.

Figure 8:
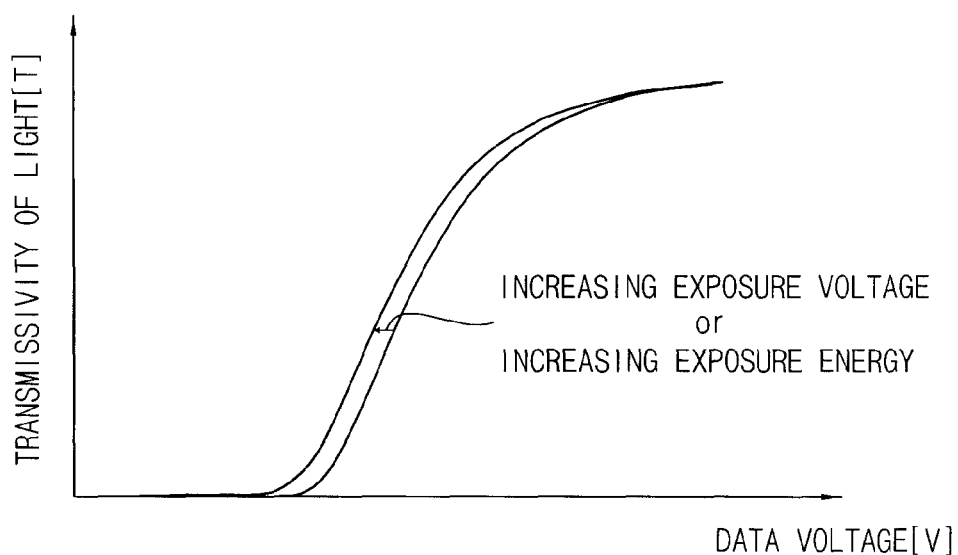
FIG. 8 is a graph illustrating an exemplary embodiment of a relationship between a data voltage and light transmissivity according to exposure voltage or exposure energy.

FIG. 8 is a graph illustrating a relationship between a data voltage and light transmissivity according to exposure voltage or exposure energy.

Referring to FIG. 8, when the exposure voltage applied between the pixel electrode 140 and the common electrode 240 is increased or the energy level of light applied to the display panel is increased, a voltage-transmissivity ("VT") curve is shifted to lower values of voltage, thus to the left in FIG. 8. In an embodiment, the VT curve represents a relationship between a data voltage applied to the pixel electrode 140 and light transmissivity through the pixel electrode 140.

When the VT curve is shifted to lower values (to the left in FIG. 8), the VT curve represents increasing the light transmissivity with respect to the same data voltage. Thus, in an embodiment, when the exposure voltage applied to the pixel electrode 140 and the common electrode is increased, or the energy level of light applied to the display panel is increased, light transmissivity may be increased with respect to a given data voltage.

As a result, when a second exposure voltage, which is greater than a first exposure voltage, is applied to the lower pixel electrode LP, and the first exposure voltage is applied to the higher pixel electrode HP, or light of a second energy level, which is greater than an energy level of light of a first energy level, is applied to the higher pixel electrode HP, a luminance generated at the higher pixel electrode HP may be increased more than a luminance generated at the lower pixel electrode LP.

Hereinafter, a process for manufacturing the display panel shown in FIG. 7 is described in detail.

Figure 9:
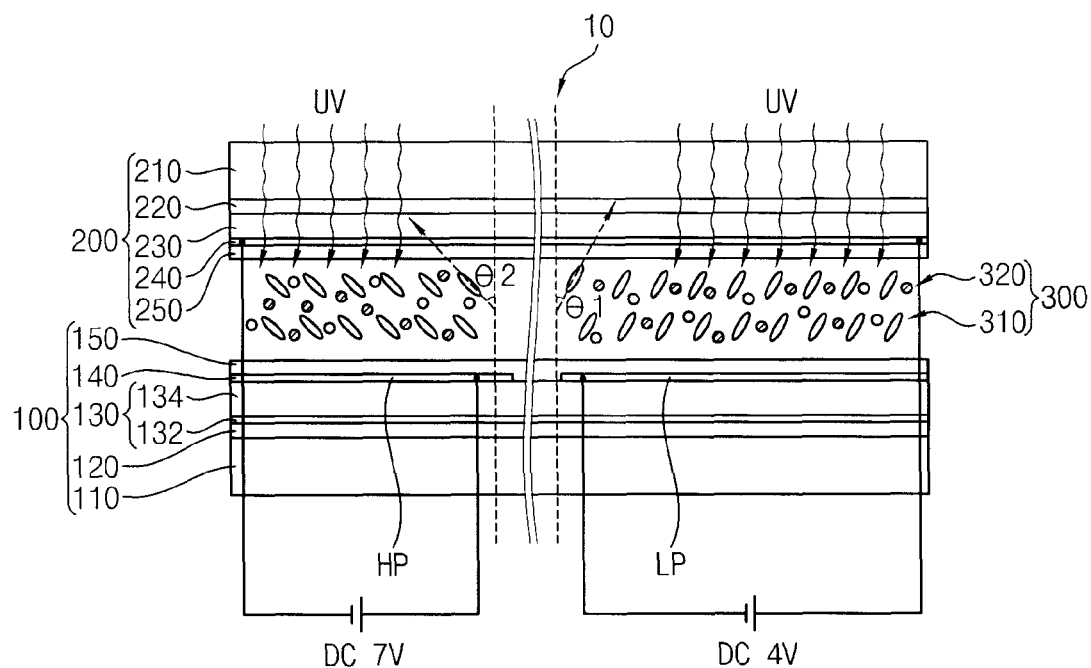
FIGS. 9 and 10 are cross-sectional views schematically illustrating an exemplary embodiment of a process for manufacturing the display panel in FIG. 7.
Figure 10:
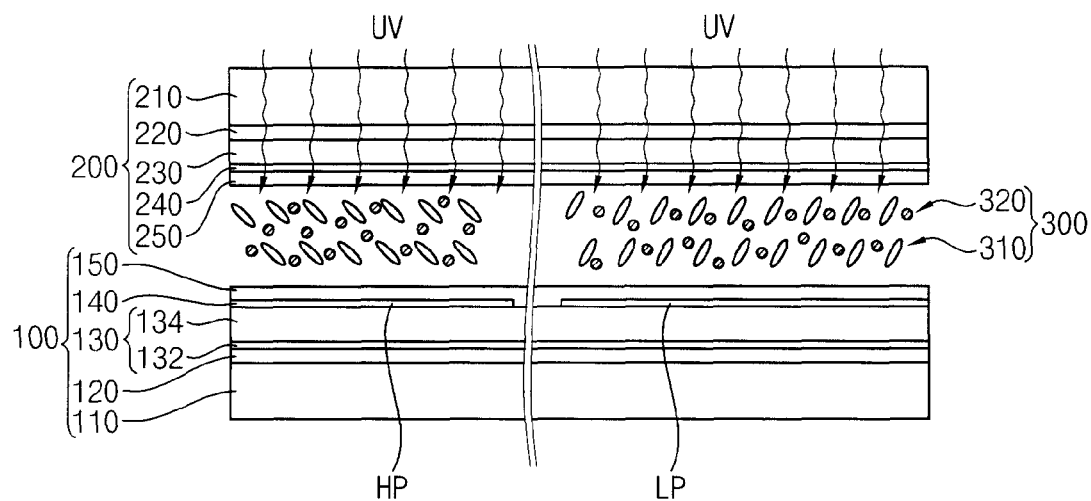

FIGS. 9 and 10 are cross-sectional views schematically illustrating an exemplary embodiment of a process for manufacturing the display panel shown in FIG. 7. More particularly, FIG. 9 is a cross-sectional view illustrating an exemplary embodiment of a process in which light is applied while an exposure voltage is applied between a pixel electrode and a common electrode, and FIG. 10 is a cross-sectional view illustrating an exemplary embodiment of a process in which light is applied when the exposure voltage is not applied.

Referring to FIG. 9, the first substrate 100 and the second substrate 200 in FIG. 7 are disposed, and the liquid crystal molecules 310 and the UV-curable particles 320 are disposed between the first and second substrates 100 and 200 to form the liquid crystal layer 300. Then, when a common voltage is applied to the common electrode 240, a first exposure voltage is applied to the lower pixel electrode LP, a second exposure voltage, which is greater than the first exposure voltage, is applied to the higher pixel electrode HP, and light, for example UV light, is disposed on the display panel to cure a portion of the UV-curable particles 320. In an embodiment, the common voltage may be about 0 V, the first exposure voltage may be between about 2 V to about 6 V, specifically about 4 V, and the second exposure voltage may be between about 5 V to about 9 V, specifically about 7 V.

As a result, molecules corresponding to the lower pixel electrode LP, among the liquid crystal molecules 320, may be pretilted at a first angle θ1 with respect to the perpendicular direction 10, and molecules corresponding to the higher pixel electrode HP among the liquid crystal molecules 320 may be pretilted at a second angle θ2, wherein the second angle θ2 is greater than the first angle θ1 with respect to the perpendicular direction 10.

Alternatively, when the first and the second exposure voltages are applied to the lower and the higher pixel electrodes LP and HP, respectively, the energy levels of light applied to the display panel may be substantially identical to each other with respect to the lower and the higher pixel electrodes LP and HP. In an embodiment, the energy levels of light applied to the display panel may be between about 1 joule ("J") to about 20 J, specifically between about 3 J to about 10 J, more specifically between about 5 J to about 7 J, per unit area.

However, when the first and the second exposure voltages are applied to the lower and the higher pixel electrodes LP and HP, respectively, the energy levels of light applied to the display panel may be different from each other with respect to the lower and the higher pixel electrodes LP and HP. Thus, in an embodiment, the energy level of light applied to the lower pixel electrode LP may be about 3 J per unit area, and the energy level of light applied to the higher pixel electrode HP may be about 7 J per unit area.

Referring to FIG. 10, after performing an electric field exposure, remaining particles are cured by irradiating light on the display panel so that the remaining particles that have not been cured among the UV-curable particles 320 are cured under conditions in which the exposure voltage is not applied between the pixel electrode 140 and the common electrode 240. Thus, all of the remaining particles are cured without electric field exposure.

In this embodiment, the energy level of light applied without an electric field may be greater than an energy level of light applied with an electric field to rapidly cure the remaining particles. For example, the energy level of light applied without an electric field may be between about 10 J to about 50 J, specifically between about 20 J to about 40 J, more specifically about 30 J per unit area.

Hereinafter, a process for manufacturing a display panel in FIG. 7 will be described in further detail.

Figure 11:
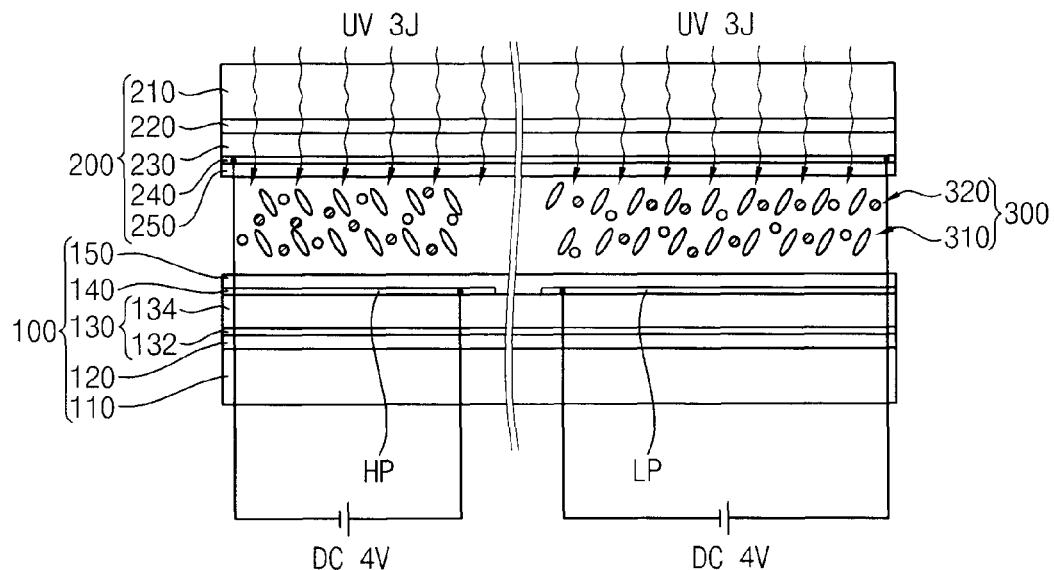
FIGS. 11, 12, and 13 are cross-sectional views schematically illustrating another exemplary embodiment of a process for manufacturing the display panel in FIG. 7.
Figure 12:
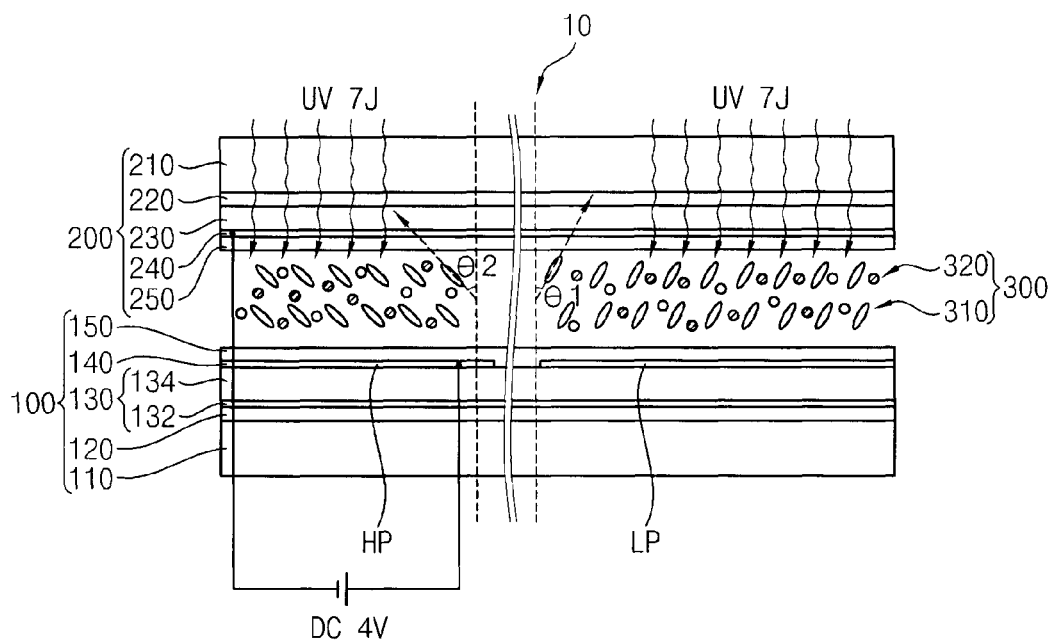
Figure 13:
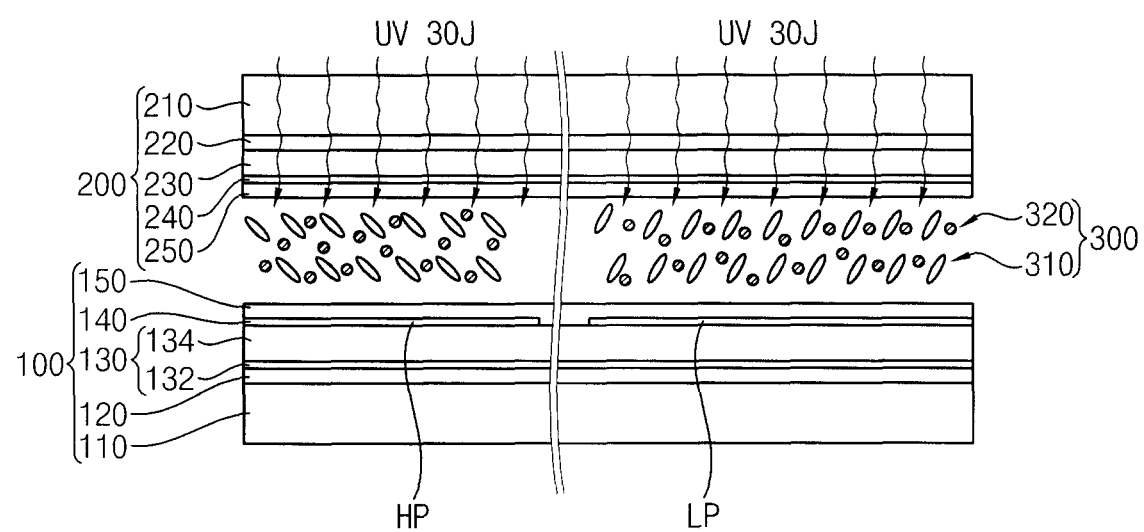

FIGS. 11 to 13 are cross-sectional views schematically illustrating another exemplary process for manufacturing the display panel shown in FIG. 7. More particularly, FIG. 11 is a cross-sectional view illustrating an exemplary embodiment of a process in which light is applied when an exposure voltage is applied between a pixel electrode and a common electrode, FIG. 12 is a cross-sectional view illustrating an exemplary embodiment of a process in which light is applied when the exposure voltage is not applied to the higher pixel electrode, and FIG. 13 is a cross-sectional view illustrating an exemplary embodiment of a process in which light is applied when the exposure voltage is not applied.

Referring to FIG. 11, the first substrate 100 and the second substrate 200 of FIG. 7 are formed, the liquid crystal molecules 310 and the UV-curable particles 320 are disposed between the first and the second substrates 100 and 200 to form the liquid crystal layer 300.

Then, a common voltage is applied to the common electrode 240, an identical exposure voltage is applied to the lower and the higher pixel electrodes LP and HP, respectively, and light, for example, UV light, is irradiated on the display panel to cure a portion the UV-curable particles 320.

In an embodiment, the common voltage may be about 0 V, and the exposure voltage may be between about 2 V to about 8 V, specifically between about 3 V to about 7 V, more specifically about 4 V. Also, an energy level of light disposed on the display panel may be between about 1 J to about 6 J, specifically between about 2 J to about 5 J, more specifically about 3 J per unit area. As a result, the liquid crystal molecules 320 may be pretilted at a selected angle θ with respect to the perpendicular direction 10.

Referring to FIG. 12, after pretilting a portion of the UV-curable particles 320, an exposure voltage is not applied to the lower pixel electrode LP, an exposure voltage is applied to the higher pixel electrode HP, and light is disposed on the display panel to cure the remaining UV-curable particles that have not been cured. In an embodiment, when an exposure voltage of about 4 V is applied to the higher pixel electrode HP, light having an energy of about 7 J per unit area may be disposed on the display panel.

Thus, in an embodiment, an exposure voltage is omitted on the lower pixel electrode LP and an exposure voltage is included on the higher pixel electrode HP, therefore liquid crystal molecules corresponding to the higher pixel electrode HP may be pretilted at a greater angle, or the number of pretilted particles may be increased.

In an embodiment, molecules corresponding to the lower pixel electrode LP, among the liquid crystal molecules 320, may be pretilted at a first angle θ1 with respect to the perpendicular direction 10, and molecules corresponding to the higher pixel electrode HP, among the liquid crystal molecules 320, may be pretilted at a second angle θ2, wherein the second angle θ2 is greater than the first angle θ1 with respect to the perpendicular direction 10.

As a result, referring to FIGS. 11 and 12, while the exposure voltage is applied to the higher pixel electrode HP for a longer time than the lower pixel electrode LP, light may be disposed on the display panel. Thus, the energy levels of light applied to portions of the display panel corresponding to the lower and the higher pixel electrodes may be substantially identical to each other, or the energy levels of light applied to the portions of the display panel corresponding to the lower and the higher pixel electrodes may be different from each other.

Referring to FIG. 13, after performing an electric field exposure to the higher pixel electrode HP for a long time, while the exposure voltage is not applied between the pixel electrode 140 and the common electrode 240, light is irradiated on the display panel to cure the remaining particles among the UV-curable particles 320 that have not been cured. Thus, all of the remaining particles are cured without electric field exposure. In an embodiment, the energy levels of light applied without electric field exposure may be between about 20 J to about 50 J, specifically between about 25 J to about 40 J, more specifically about 30 J per unit area.

According to this embodiment, the display panel may be formed of using at least one method among a first method in which exposure voltages different from each other are applied to each of the lower and the higher pixel electrodes, a second method in which an identical exposure voltage is applied to each of the lower and the higher pixel electrodes for a time different from each other, a third method in which light having energy levels different from each other are applied to each of the lower and the higher pixel electrodes, and a fourth method in which light having identical energy levels are applied to each of the lower and the higher pixel electrodes for different amounts of time. In addition, the display panel may be formed using a combination of any of the foregoing methods.

Accordingly, UV-curable particles are cured to pretilt liquid crystal molecules at different angles from each other with respect to the lower and higher pixel electrodes using at least one of the disclosed methods so that the viewing properties of a display panel may be improved.

The foregoing is illustrative and is not to be construed as limiting the disclosed embodiments. Although a few exemplary embodiments have been described, those skilled in the art will readily appreciate that many modifications are possible without materially departing from the novel teachings and advantages disclosed herein. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of manufacturing a display panel, the method comprising:
   forming a display panel comprising a first substrate, the first substrate including a pixel electrode disposed thereon, a second substrate having a common electrode disposed thereon, and a liquid crystal layer interposed between the first and the second substrates, the liquid crystal layer comprising a plurality of liquid crystal molecules and a plurality of ultraviolet-curable particles; and
   curing a portion of the ultraviolet-curable particles by disposing light on the display panel, wherein an exposure voltage, which is greater than a maximum data voltage which corresponds to a maximum grayscale data of the display panel, is applied between the pixel electrode and the common electrode,
   wherein the pixel electrode comprises:
      a lower pixel electrode, which receives a first data voltage; and
      a higher pixel electrode, which receives a second data voltage, wherein the second data voltage is greater than the first data voltage,
   wherein the curing of the portion of the ultraviolet-curable particles further comprises:
      applying a first exposure voltage to the lower pixel electrode, wherein the first exposure voltage is greater than the maximum data voltage; and
      applying a second exposure voltage to the higher pixel electrode, wherein the second exposure voltage is greater than the first exposure voltage.

2. The method of claim 1, wherein the exposure voltage is between about 7 volts to about 20 volts.

3. The method of claim 1, further comprising:
   curing the remaining ultraviolet-curable particles, which were not cured by irradiating light on the display panel, wherein the exposure voltage is not applied during the curing of the remaining ultraviolet-curable particles.

4. The method of claim 1, wherein the curing of the portion of the ultraviolet-curable particles further comprises:
   applying light of a first energy level to the lower pixel electrode; and
   applying light of a second energy level to the higher pixel electrode, wherein the second energy level is greater than the first energy level.

5. The method of claim 1, wherein the light is ultraviolet light.

6. The method of claim 1, wherein the content of the ultraviolet-curable particles is less than or equal to about 0.2 weight percent with respect to the liquid crystal molecules.

7. The method of claim 1, wherein the pixel electrode further comprises a plurality of slits.

* * * * *